US012614784B2

(12) United States Patent
Woltmann et al.

(10) Patent No.: US 12,614,784 B2
(45) Date of Patent: Apr. 28, 2026

(54) COOLING DEVICE FOR A RECHARGEABLE BATTERY

(71) Applicant: Miba eMobility GmbH, Laakirchen (AT)

(72) Inventors: Pierre Woltmann, Ingolstadt (DE); Stefan Gaigg, Gmunden (AT); Thomas Haidwagner, Oberndorf (AT)

(73) Assignee: Miba eMobility GmbH, Laakirchen (AT)

( * ) Notice: Subject to any disclaimer, the term of this patent is extended or adjusted under 35 U.S.C. 154(b) by 421 days.

(21) Appl. No.: 18/028,867

(22) PCT Filed: Sep. 29, 2021

(86) PCT No.: PCT/EP2021/076758
§ 371 (c)(1),
(2) Date: Mar. 28, 2023

(87) PCT Pub. No.: WO2022/069524
PCT Pub. Date: Apr. 7, 2022

(65) Prior Publication Data
US 2023/0291033 A1 Sep. 14, 2023

(30) Foreign Application Priority Data

Sep. 29, 2020 (DE) ..................... 10 2020 125 449.0

(51) Int. Cl.
*H01M 10/6568* (2014.01)
*H01M 10/613* (2014.01)
*H01M 10/625* (2014.01)

(52) U.S. Cl.
CPC ..... *H01M 10/6568* (2015.04); *H01M 10/613* (2015.04); *H01M 10/625* (2015.04)

(58) Field of Classification Search
CPC ........... H01M 10/6568; H01M 10/613; H01M 10/625; H01M 10/6556; Y02E 60/10; Y02T 10/70
See application file for complete search history.

(56) References Cited

U.S. PATENT DOCUMENTS 11,296,368 B2   4/2022   Astecker et al.
11,355,799 B2   6/2022   Schmitt et al.
(Continued)

FOREIGN PATENT DOCUMENTS

AT            520 018 A1   12/2018
DE   10 2017 210 343 A1   12/2018
(Continued)

OTHER PUBLICATIONS

International Search Report in PCT/EP2021/076758, mailed Mar. 3, 2022.
(Continued)

*Primary Examiner* — Frantz F Jules
(74) *Attorney, Agent, or Firm* — Collard & Roe, P.C.

(57) ABSTRACT

A device for cooling or temperature control for at least one storage module of a rechargeable battery includes a first single-layer or multi-layer film and a further single-layer or multi-layer film, which are partially connected thus forming at least one coolant channel for a cooling fluid. At least one structural element is arranged between the first film and the further film, the structural element being configured to be stiffer as compared to the first film and the further film and being connected to the first film and/or to the further film.

9 Claims, 4 Drawing Sheets

(56)     References Cited

U.S. PATENT DOCUMENTS

2018/0178675  A1     6/2018  Suzuki et al.
2021/0184291  A1     6/2021  Gaigg et al.

FOREIGN PATENT DOCUMENTS

| | | | | |
|---|---|---|---|---|
| DE | 10 2018 216708 | A1 | 4/2020 | |
| HU | P0101973 | A2 * | 3/2003 | ............. F16K 35/16 |
| KR | 2016 0065637 | A | 6/2016 | |
| WO | 02/093054 | A1 | 11/2002 | |
| WO | WO-2018158240 | A1 * | 9/2018 | ............... H01Q 5/30 |
| WO | WO-2018233902 | A1 * | 12/2018 | ......... H01M 50/141 |
| WO | 2020/041810 | A1 | 3/2020 | |

OTHER PUBLICATIONS

International Search Report in PCT/EP2021/076781, mailed Jan. 4, 2022.

* cited by examiner

COOLING DEVICE FOR A RECHARGEABLE BATTERY

CROSS REFERENCE TO RELATED APPLICATIONS

This application is the National Stage of PCT/EP2021/076758 filed on Sep. 29, 2021, which claims priority under 35 U.S.C. § 119 of German Application No. 10 2020 125 449.0 filed on Sep. 29, 2020, the disclosure of which is incorporated by reference. The international application under PCT article 21 (2) was not published in English.

BACKGROUND OF THE INVENTION

1. Field of the Invention

The invention relates to a device for cooling or temperature control for at least one storage module of a rechargeable battery, wherein the device comprises a first single-layer or multi-layer film and a further single-layer or multi-layer film, which are partially connected to one another forming at least one coolant channel for a cooling fluid.

The invention further relates to a rechargeable battery having at least one storage module for electrical energy and at least one device for cooling or temperature control for the at least one storage module.

Moreover, the invention relates to a vehicle having at least one rechargeable battery.

2. Description of the Related Art

The service life and effectiveness as well as the safety of a rechargeable battery for e-mobility depend, among other factors, on the temperature during operation. For this reason, various concepts have been suggested for the cooling and/or temperature control of the rechargeable batteries. These concepts can be divided into essentially two types, namely air cooling and water cooling and/or in general cooling with liquids.

For water cooling, cooling bodies in which at least one coolant channel is formed are used. These cooling bodies are arranged between the individual modules of the rechargeable battery or on the modules. In this regard, a module is an individual unity of the rechargeable battery, i.e. not obligatorily just a cell.

In the arrangement on the modules, the cooling bodies are usually designed such that they cover all modules of the rechargeable battery. However, this results in the problem that due to tolerances etc. the cooling body does not lie against the modules evenly. To remedy this, the cooling body is screwed to each individual module. However, this entails the disadvantage that the production of the rechargeable battery is correspondingly complex and thus cost-intensive. This, in turn, impairs the acceptance of e-mobility per se.

Besides such cooling bodies, cooling devices, which are flexible and can thus adapt to the underground, already have been described in the prior art. AT 520 018 A1, for example, describes a rechargeable battery having at least one storage module for electrical energy and at least one cooling device for cooling or temperature control for the at least one storage module, wherein the cooling device comprises at least one coolant channel, at least one coolant inlet and at least one coolant outlet, and wherein the cooling device comprises single-layer or multi-layer films. The coolant channel is formed by the films and between these. Furthermore, the cooling device rests on the at least one storage module with one of the films.

SUMMARY OF THE INVENTION

The present invention is based on the object of improving the usability of the described cooling device with the two films in an electric vehicle and/or the cooling of a battery in an electric vehicle.

The object of the invention is achieved in the initially mentioned device for cooling or temperature control for at least one storage module of a rechargeable battery in that at least one structural element is arranged between the first film and the further film, said structural element being configured to be stiffer as compared to the first film and the further film and being connected to the first film and/or to the further film.

Furthermore, the object of the invention is achieved in the initially mentioned battery in that it comprises the device for cooling or temperature control for at least one storage module according to the invention.

Moreover, the object of the invention is achieved in the initially mentioned vehicle which comprises the battery according to the invention.

The advantage of this is that the device for cooling or temperature control for at least one storage module can be better adapted to the respective influences of the surroundings. Hence, with the structural element, for example, a stiffening of the device merely in partial areas is possible, such that the device in other partial areas still has the desired flexibility. By said flexibility, as is known, the device can better compensate for tolerances in the "battery" system, whereby the heat transfer and thus the efficacy of the device can be improved. By the structural element, the mechanical connection of the device with the battery can also be improved. Furthermore, by the structural element, properties of the device can be adapted and/or improved which are in direct connection with the coolant, such as the sealing of the device or the flow behavior of the coolant within the device, etc. In this regard, it is generally advantageous that the adaption and/or improvement of properties of the device for cooling or temperature control for at least one storage module can be performed without a great constructional effort in that the at least one component is integrated already during the partial connection of the two films with one another.

According to an embodiment variant of the invention, it can be provided that the structural element is arranged outside the at least one coolant channel. By this embodiment variant, embodiments of the device can be achieved in which influence on the flow behavior of the coolant is present or not, depending on whether or not the coolant channel is narrowed by the arrangement of the structural element. Moreover, hence, the size of the change of the flow cross-section of the coolant channel can be adapted relatively easily. The advantage of this is that the structural element does not come into contact with the coolant, whereby the effect of the cooling fluid onto the component can be minimized as well. This, in turn, allows for a larger selection of materials to be used for the structural element, whereby, optionally, weight and costs can be saved with regard to the device.

According to another embodiment variant of the invention, it can be provided that the entire structural element is arranged between the first film and the further film. By the complete arrangement of the at least one structural element between the two films, the production of the device for cooling or temperature control can be simplified by the prevention of projecting parts, such that the structural element can, for example, be sealed in when the films are sealed.

BRIEF DESCRIPTION OF THE DRAWINGS

For the same reason, according to a further embodiment variant of the invention, it can be advantageous for the structural element to be arranged at a distance from the side edges of the device.

For better connectivity of the at least one structural element to the film(s), according to a further embodiment of the invention, the structural element can consist at least partially of at least one plastic material. Furthermore, the additional weight that is introduced with the at least one structural element into the device for cooling or temperature control can thus be kept low.

According to another embodiment variant of the invention, it can be provided that the structural element comprises at least one elastomer section. By this embodiment variant, it is possible due to the compressibility of the structural element that even in those sections of the device for cooling or temperature control that are stiffened by the structural element, it allows for a certain tolerance compensation in the region of the contact of the device with the cells, whereby—as has been described above—the cooling effect of the device can be improved by the improved contact with the cells. If the structural element is used as the fixing point in the battery, thus, the safety of the assembly of the device can thus be improved, since also in this case the structural element can remain flexible to a predefinable extent.

According to a further embodiment of the invention, it can be provided that the structural element has at least one breakthrough in the direction from the first film to the further film, whereby the insertion of a connecting element for connecting the device for cooling or temperature control to the battery can be simplified.

Alternatively or additionally thereto, according to an embodiment variant of the invention, it can be provided that the structural element has at least one breakthrough in the flow direction through the at least one cooling channel, in order to be able to influence and/or change the flow behavior of the coolant in the coolant channel more directly with the structural element.

In the two last mentioned embodiments of the invention, it can be provided according to a further embodiment variant of the invention that the breakthrough is configured so as to taper. On the one hand, a centering function can thus be achieved, and on the other hand, the throttling effect of the structural element in the coolant channel can hence be changed.

According to a further embodiment variant of the invention, it can be provided that a permanent magnet is arranged in the at least one structural element. Thus, a simple and quick arrangement or attachment of the device for cooling or temperature control to a component to be cooled or temperature-controlled is possible if it has metallic parts.

According to one embodiment variant of the battery, it may be provided that the device is connected to a housing of the battery via at least one connecting element, the connecting element extending through the at least one structural element. Thereby, the tear-out resistance of the connection point of the device for cooling or temperature control can be improved via the component.

For the purpose of better understanding of the invention, it will be elucidated in more detail by means of the figures below.

Figure 1:
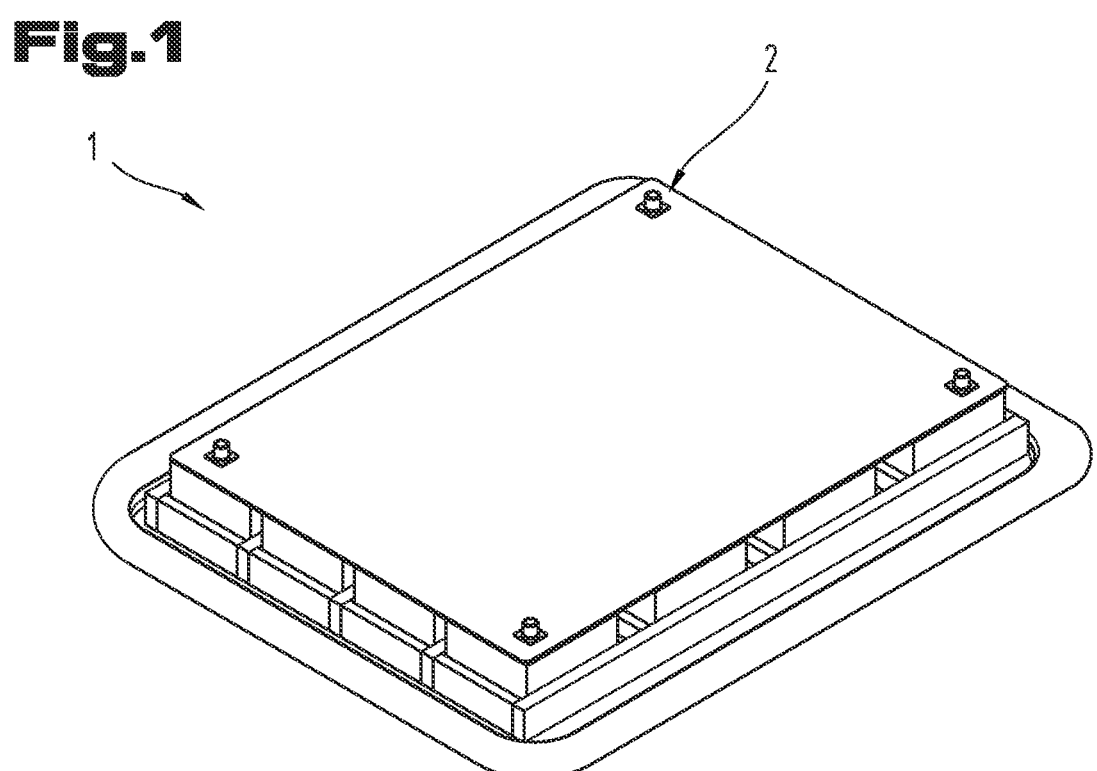
Figure 2:
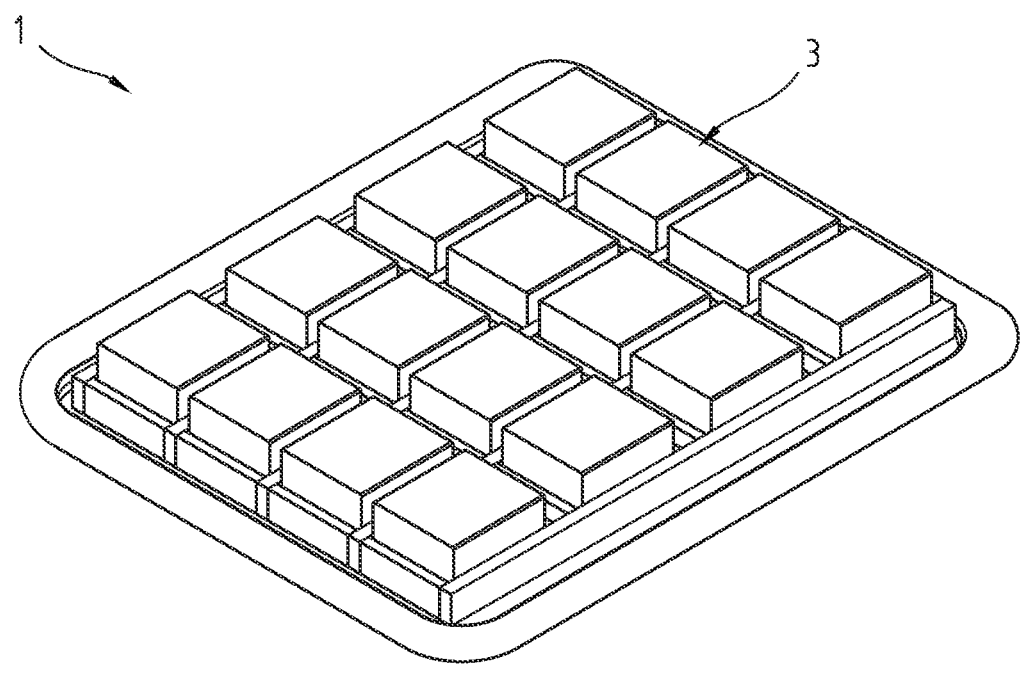
Figure 3:
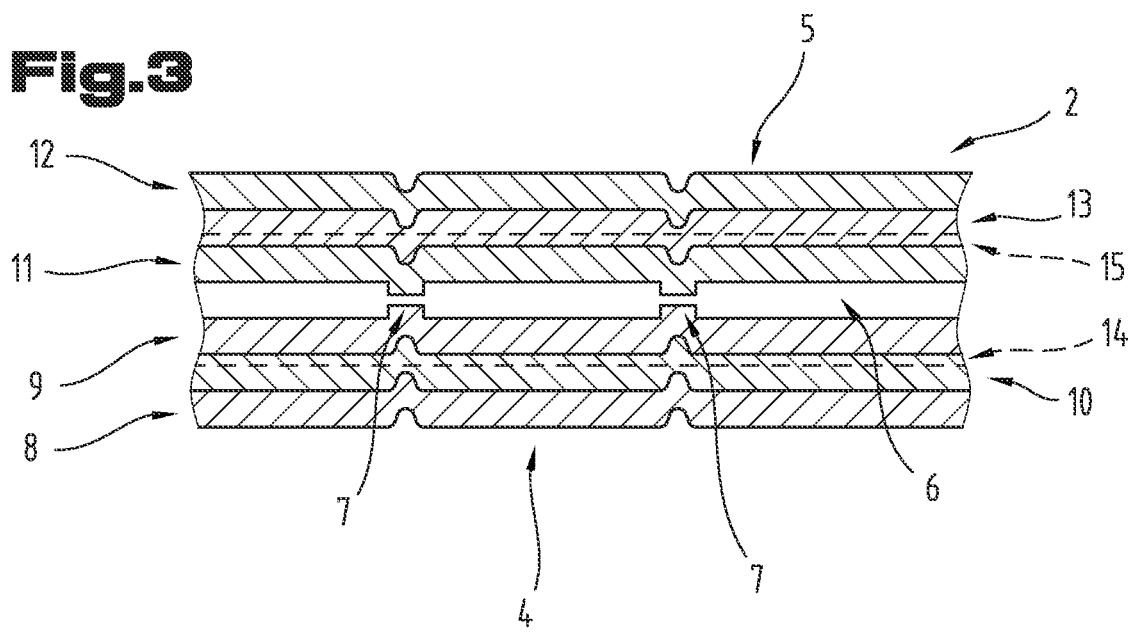
Figure 4:
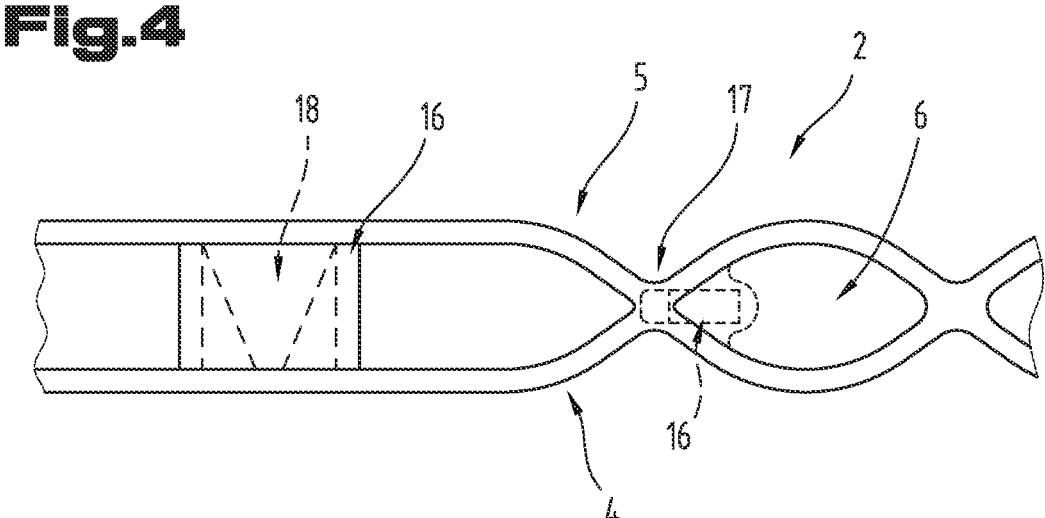
Figure 5:
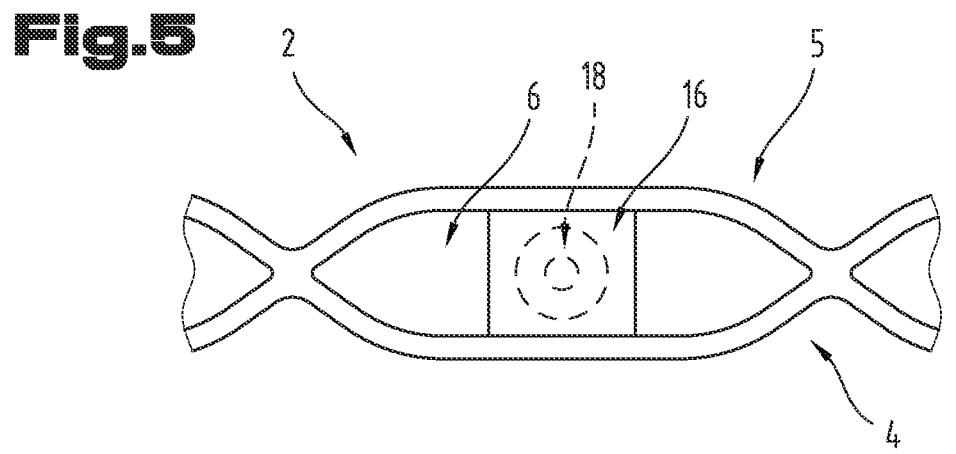
Figure 6:
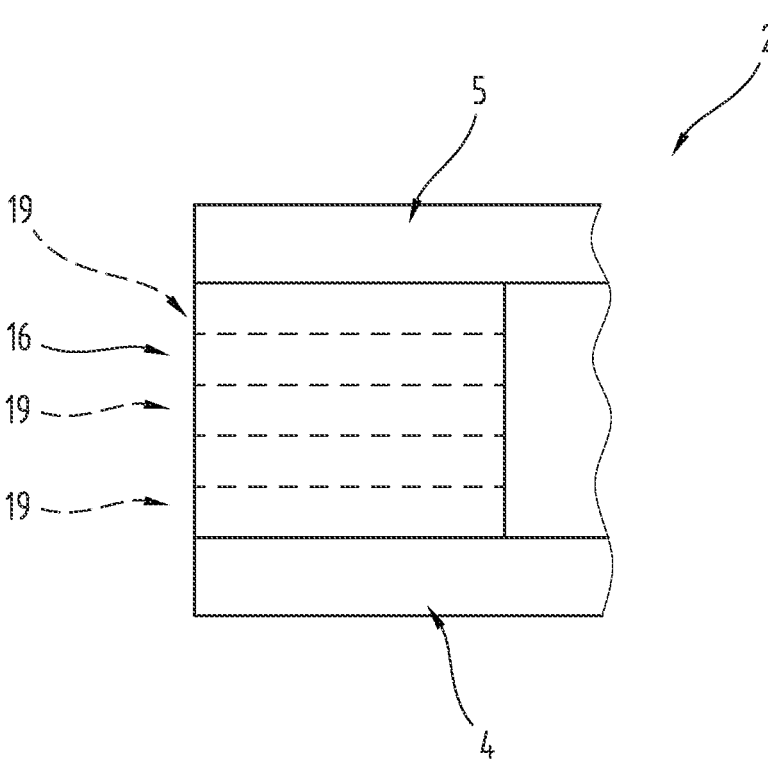
Figure 7:
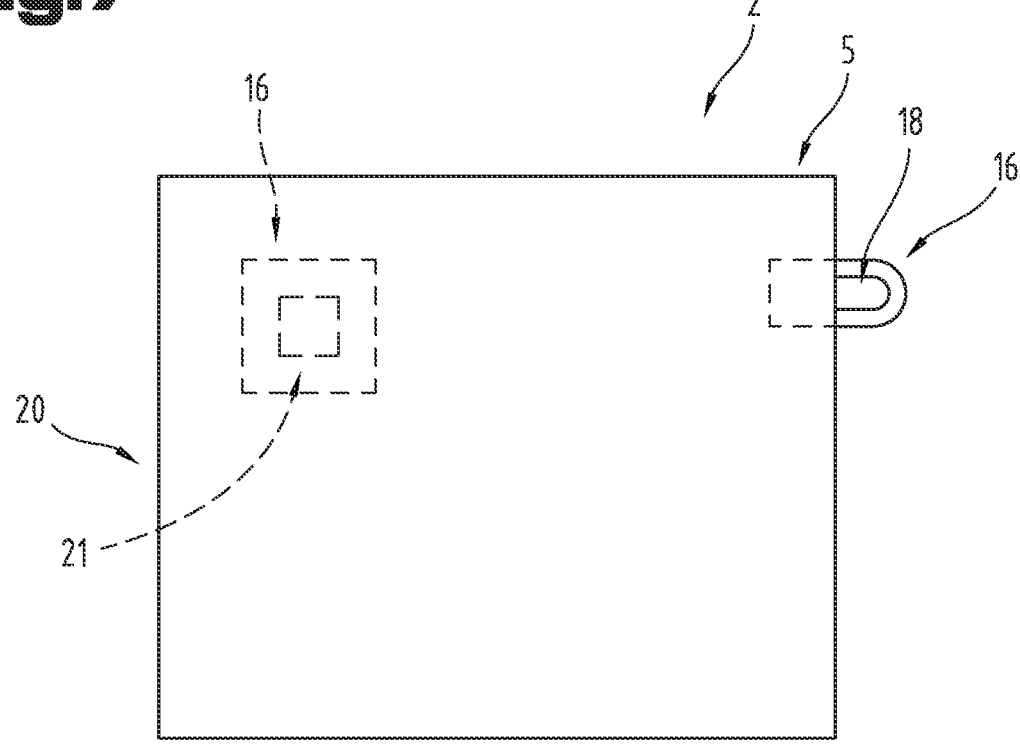
Figure 8:
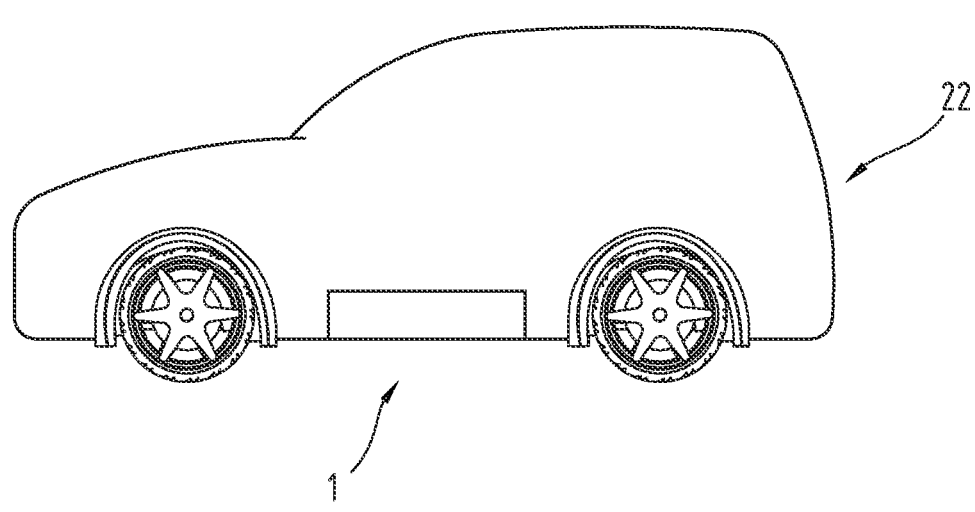
Figure 9:
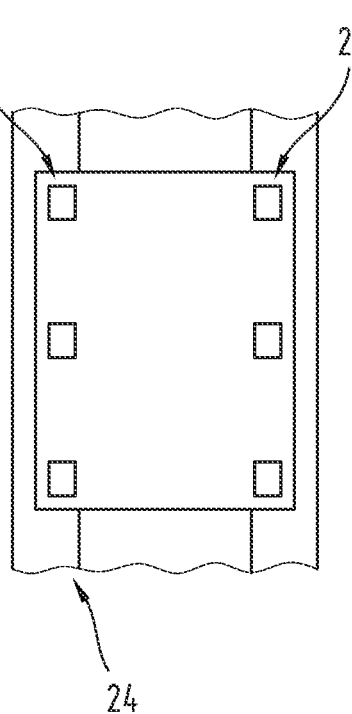

These show in a simplified schematic representation:

FIG. 1 a rechargeable battery in an oblique view with a cooling device;

FIG. 2 the battery according to FIG. 1 in an oblique view without a cooling device;

FIG. 3 a section of a cooling device in cross-section;

FIG. 4 a simplified representation from a cutout of an embodiment variant of the cooling device with a structural element;

FIG. 5 a section of a further embodiment variant of the cooling device;

FIG. 6 a section of another embodiment variant of the cooling device;

FIG. 7 a section of a further embodiment variant of the cooling device;

FIG. 8 a vehicle with a rechargeable battery;

FIG. 9 a section of a battery with the cooling device.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIGS. 1 and 2 show a rechargeable battery 1, also referred to as accumulator (hereinafter merely referred to as battery 1), in an oblique view, wherein FIG. 1 shows the battery 1 with a device 2 for cooling or temperature control (hereinafter merely referred to as device 2) and FIG. 2 shows the battery 1 without this device 2.

The battery 1 comprises multiple storage modules 3 for electrical energy. In the represented example there are 16 storage modules 3. However, this number is not to be considered restricting.

The storage modules 3 may comprise multiple cells.

As the basic construction of such batteries 1 for e-mobility is known from the prior art, reference is made thereto so as to avoid repetitions.

As can be seen from the comparison of the two FIGS. 1 and 2, the device 2 is arranged on a side of the battery 1, in particular on the top. However, it may also be provided that the device 2 is arranged at multiple sides of the battery 1 and extends across at least two surfaces of the battery 1, for example on the top and laterally and optionally on the bottom.

The device 2 may extend across all storage modules 3, in particular their upper sides (as can be seen from FIG. 1) such that all storage modules 3 can be cooled by means of just one device 2. However, in general, it is also possible to provide multiple devices 2 in the battery 1 and/or on the battery 1, for example two or three or four, such that for example the storage modules 3 are distributed to two or three or four, etc. devices 2.

Reference is made to the fact that the terms upper side etc. refer to the installation position the battery 1 in a vehicle and/or motor vehicle.

FIG. 3 shows a section of the device 2 shown in cross-section.

In general, the device 2 comprises a single-layer or multi-layer film 4 in all embodiment variants of the invention. By means of this first film 4, the device 2, in particular directly, lies against the storage module 3 or the storage modules 3. The contact is for example established at the upper side of the storage modules 3, as was elucidated above. As the first film 4 is flexible, i.e. not stiff, said first film 4 can better adapt to surface irregularities of the storage modules 3 or between the storage modules 3. A leveling compound between the device 2 and the storage modules 3 is not required. Hence, heat transmission from the storage modules 3 into the device 2 can be improved.

In the embodiment variant of the device 2 according to FIG. 3, this first film 4 is connected to a further film 5. Said further film 5 is also configured so as to have multiple layers, but can also be configured so as to have merely one layer. Between the further film 5 and the first film 4, a coolant channel 6 is formed. For this purpose, the further film 5 may be connected to the first film 4 via webs 7. The webs 7 may, for example, be formed during the connection of the first to the further film 4, 5, e.g. by heat sealing or gluing. However, embodiments of the device 1 without these webs 7 are also possible.

The first film 4 can be adhered to the further film 5. However, other connecting techniques may also be applied to connect the first film 4 to the further film 5. The connecting techniques are preferably selected such that no additional measures need to be taken to obtain a liquid-tight design of the connection.

The respectively optimized extent of the at least one coolant channel 6 and/or the coolant channels 6 is among other factors determined by the amount of heat that needs to be conducted away, the geometry of the battery 1, etc., which is why no further details are elucidated in this regard here.

As already mentioned, the first film 4, and optionally the further film 5, are configured to have multiple layers. In particular, they may consist of a laminate.

In the preferred embodiment variant, the first film 4 comprises or consists of a first plastic layer 8, a second plastic layer 9, and a layer 10 arranged between the two plastic layers. As already mentioned, however, the first film 4 may also be configured so as to have merely one layer and then comprises the first plastic layer 8, which is optionally configured so as to be (fiber-) reinforced.

If the further film 5 has the same structure, it may comprise or consist of a first plastic layer 11, a second plastic layer 12, and a layer 13 arranged between the two plastic layers. However, it may also consist of only one of the or both, optionally (fiber-) reinforced, plastic layer(s) 11, 12.

Optionally, the first film 4 and/or the further film 5 may have an enforcement layer 14, 15, which is in particular connected to the first plastic layer 8, 11, which may also be connected to or replace the layer 10, 13. It is also possible that the first plastic layer 8, 11 or the second plastic layer 9, 12 is replaced by the enforcement layer 14, 15.

In general, other laminates can be used as well. For example, merely the first film 4 may be provided with the layer 10 or merely the further film 5 may be provided with the layer 13. Likewise, structures of the first film 4 and/or the further film 5 with two layers or with more than three layers are possible. However, preferably, the film 4 and the further film 5 are designed equally.

In this embodiment variant, the at least one coolant channel 6 is not formed by separate components, but by the just partial connection of the first film 4 to the further film 5. The wall or the walls of the at least one coolant channel 6 are thus formed by the first film 4 and the further film 5, preferably half by each.

The layer 10, 13 may be electrically conductive. It may, for example, consist of an electrically conductive plastic material, an electrically conductive elastomer, or be made of an electrically conductive paint. For this purpose, electrically conductive particles, such as graphite, metal particles, etc., may be mixed into the respective base material. The layer 10, 11 may also be formed as a metal layer or as a metallized plastic layer.

The first plastic layer(s) 8, 11 and/or the further plastic layer(s) 9, 12 and/or the metalized plastic layers preferably consists/consist to at least 80 wt. %, in particular at least 90 wt. %, of a thermoplastic material or of an elastomer. The thermoplastic material may, for example, be selected from a group comprising and/or consisting of polyethylene (PE), polyoxymethylene (POM), polyamide (PA), in particular PA 6, PA 66, PA 11, PA 12, PA 610, PA 612, polyphenylene sulfide (PPS), polyethylene terephthalate (PET), crosslinked polyolefins, preferably polypropylene (PP). The elastomer may, for example, be selected from a group comprising and/or consisting of thermoplastic elastomers such as thermoplastic vulcanizates, olefin-, amine-, ester-based thermoplastic polyurethanes, in particular ether-based/ester-based thermoplastic elastomers, styrene block copolymers, silicone elastomers.

At this point, it should be noted that the term plastic material is understood as a synthetic or natural polymer produced from corresponding monomers.

Preferably, the first plastic layer(s) 8, 11 and/or the further plastic layer(s) 9, 12 and/or the metalized plastic layer(s)/consist of a so-called sealing film. This has the advantage that the respective layers can be connected to one another directly.

However, it is also possible to use other plastic materials, such as thermosetting plastic materials and/or thermosetting materials, which are then for example adhered to one another by means of an adhesive. Two-part adhesive systems based on polyurethane or silicone or hot melt adhesive systems are particularly suitable for this purpose.

It should be noted at this point that, in order to produce the first and/or the further film 4, 5, individual films made of the respective materials can be used which are bonded together.

Preferably, the possibly present enforcement layer(s) 14, 15 comprise/comprises or consist/consists of a fiber reinforcement which is preferably formed as a separate layer. The fiber reinforcement can be formed of fibers and/or threads, which are selected from a group comprising or consisting of glass fibers, aramid fibers, carbon fibers, mineral fibers such as basalt fibers, natural fibers such as hemp, sisal and combinations thereof.

Preferably, glass fibers are used as fiber reinforcement. The proportion of the fibers, in particular the glass fibers, in the fiber reinforcement can amount to at least 80 wt. %, in particular at least 90 wt. %. Preferably, the fibers and/or threads of the fiber reinforcement consist merely of glass fibers.

The fibers and/or threads can be present in the fiber reinforcement as roving, for example as a non-woven fabric. However, preferably the fibers and/or threads become a woven fabric or a knitted fabric. In this regard, it is also possible that the woven or knitted fabric is merely present in some regions and that the remaining regions of the fiber reinforcement are formed by a roving.

It is also possible that rubberized fibers and/or threads are used as or for the fiber reinforcement.

When using a woven fabric, different types of weaves are possible, in particular plain, twill or satin weave. Preferably, a plain weave is used.

However, it is also possible to use an open-mesh glass fabric or glass roving.

Coated paper can also be used as fiber reinforcement. The paper is equipped to be resistant to liquids by the coating.

In the alternative or in addition to the fiber reinforcement, the enforcement layer(s) 14, 15 can comprise a mineral filling. For example, calcium carbonate, talc, quartz, wollastonite, kaolin or mica can be used as a mineral filling (mineral filler material).

The metal layer is, in particular, formed from aluminum and/or consists thereof. However, other materials such as copper or silver can also be used.

The metal layer may have a layer thickness of between 5 $\mu m$ and 200 $\mu m$ in particular of between 60 $\mu m$ and 200 $\mu m$.

The plastic layers 8, 9, 11, 12 may have a layer thickness of between 10 $\mu m$ and 200 $\mu m$.

The layer thickness of the enforcement layer(s) 14, 15 may amount to between 5 $\mu m$ and 50 $\mu m$.

Although the films 4, 9 can in general be used in the form of individual films for producing the device 2, such that the film laminate(s) are only formed in the course of the production of the device 2, it is advantageous if the films 4, 9 are used as a (laminated) semi-finished product.

For connecting the individual layers of the laminate or the laminates, these can be adhered to one another by means of adhesives. The afore-mentioned adhesives are suitable for this purpose. Besides adhesives, coextrusion and extrusion coating can also be used as joining options. Of course, a combination is also possible in which several plastic materials are coextruded and adhesively laminated to one another with an extrusion-coated metal or (fiber) enforcement layer. In general, all known methods can be used for producing composite films and/or film laminates.

It is provided that at least one structural element 16 (which can also be configured as a built-in element) is arranged between the first film 4 and the further film 5, as can be seen from the various embodiment variants shown in FIGS. 4-7. It should be noted, however, that the embodiment variants shown in these figures are merely for the purpose of explaining the invention and therefore have no limiting character for the invention with respect to size, shape (e.g., cube-shaped, cuboid-shaped, cylindrical, strip-shaped, etc.), specific position, intended use of the structural element 16, etc., although preferred embodiments of the invention are addressed in these figures.

As compared to the first film 4 and the further multilayer film, the structural element 16 is more rigidly formed. Preferably, the structural element 16 is connected to both films 4, 5. However, it is also possible that the structural element 16 is connected to merely one of the two films 4, 5.

The connection of the structural element 16 to the first and/or further film 4, 5 may, for example, be established by means of an adhesive agent. If sealing films are used for the first and/or further films 4, 5, the at least one structural element 16 can also be sealed in when the two films 4, 5 are joined together to form the at least one coolant channel 6. Other joining methods are also conceivable, for example by means of a laser, etc.

The connection itself can be full-surface or only partial. In this context, the expressions "full-surface" and "partial" refer to the surface(s) in contact with the films 4, 5.

Although only one structural element 16 is ever shown in the figures, the device 2 may generally have more than one structural element 16. Depending on the intended use, for example for connecting the device 2 to another structural element, or for sealing the device 2, all structural elements 16 of a device 2 may be of the same design, or different structural elements 16 may be present in the device 2.

Below, only one structural element 16 will be described or elucidated. However, the respective explanations can also be applied to other structural elements 16 or adapted accordingly.

A structural element 16 extends only over a partial area of the surface of the device 2 in a top view. This partial area can be relatively small, for example if the structural element is used as a connection point for the device 2 on another component.

The structural element 16 is preferably at least partially formed from a thermoplastic material. However, it may also at least partially consist of a thermosetting material or at least partially consist of a metal. The metal may, for example, form a reinforcement for the structural element 16.

With regard to the plastic materials, reference is made to the plastic material mentioned above, although other plastic materials than those mentioned can also be used.

As can be seen from the section of the device 2 shown in FIG. 4, according to an embodiment variant it may be provided that the structural element 16 is arranged outside the at least one coolant channel 6. In this case, the structural element 16 can be arranged directly adjacent to the coolant channel 6, for example in a connection area 17 in which the first film 4 is connected to the further film 4, 5, or as shown in FIG. 4 at a distance from this connection area 17. If the structural element 16 is arranged immediately adjacent to the coolant channel 6, it may be arranged narrowing into the coolant channel 16 in this region, as indicated in dashed lines in FIG. 4.

In the embodiment variant shown in FIG. 4, the structural element 16 may also be used, for example, to reinforce the connection area 17 between the first and the further film 4, 5 and or as a fastening point for connecting the device 2 to a further component.

Narrowing of the coolant channel 6 may also be achieved by arranging the structural element 16 entirely in the coolant channel 6, as can be seen in FIG. 5.

As can be seen from the embodiment variants shown in FIGS. 4 and 5, the structural element 16 may also have one breakthrough 18 or multiple breakthroughs 18. In the embodiment variant according to FIG. 4, the at least one breakthrough 18 extends from the first film 4 in the direction towards the second film 5. Alternatively or additionally, at least one breakthrough 18 may extend in the direction of flow of the coolant, as can be seen in FIG. 5. In this embodiment variant, it is also possible for the breakthrough 18 not to run in a straight line, but to have a curved course. In addition, the breakthroughs 18 may also be arranged to run obliquely.

In all embodiments of the breakthroughs 18, these may be configured to have a constant size of the cross-sectional area over their length. However, it is also possible for the at least one breakthrough 18 to be configured so as to taper, as is also indicated by dashed lines in FIGS. 4 and 5.

The at least one breakthrough 18 may have a round, oval, square, hexagonal, etc. cross-section.

It should be noted that in the embodiment variant shown in FIG. 5, the structural element 16 extends only over a partial area of the cross-sectional area of the coolant channel 6. Alternatively, it is also possible for the structural element 16 to occupy the entire cross-sectional area if it is formed with the breakthrough 18 described, such that the coolant can flow through via the breakthrough 18. Alternatively, however, the breakthrough 18 may be omitted if the structural element 16 is to be used to close off the flow channel 6 and/or to separate it from the remainder of a flow field of coolant channels 6.

As already indicated, the structural element 16 may also consist of multiple different materials. According to a further embodiment, the structural element may have at least one elastomer section 19, as indicated by dashed lines in FIG. 6. The elastomer section 19 may, for example, be arranged at the edge and/or centrally. For example, the structural element 16 may have a sandwich-like structure.

The elastomer used for the elastomer section 19 may be selected from the elastomers mentioned above. However, a natural rubber, an (X)NBR, etc., may also be used.

According to another embodiment variant, it may be provided that the entire structural element 16 is arranged between the first multilayer film and the further multilayer film. This means that the structural element 16 does not project laterally beyond the first and second films 4, 5. The structural element 16 may be arranged at the edge between the two films 4, 5, as can be seen in FIG. 6. According to an embodiment variant in this regard, however, the structural element 16 may also be arranged at a distance from side edges 20 of the device 2, as can be seen from the top view of the device 2 shown in FIG. 7.

However, it is also possible within the scope of the invention for a structural element 16 serving for fastening purposes to be arranged so as to partially laterally project beyond the first film 4 and the further film 5, the side edges 20, as can be seen from the structural element 16 shown on the right in FIG. 7. This structural element 16 can, for example, have the breakthrough 18 for a fastening means, such as a screw or a rivet, in the part projecting beyond the side edge.

The fact that a permanent magnet 21 may be arranged in the at least one structural element 16 for reasons mentioned above, is also indicated by dashed lines in FIG. 7.

As already mentioned, the device 2 is preferably used in a vehicle, in particular a motor vehicle. For the sake of completeness only, such a vehicle 22 with a built-in battery 1 is shown in FIG. 8. The battery 1 may be held by at least one holding element.

The device 2 is connected by the at least one connecting element 23, for example a screw or a rivet, to a further component, such as a housing 24 of the battery 1, as is indicated schematically in FIG. 9. In this regard, the connecting element 23 extends through the at least one structural element 16.

Other methods of fastening the device 2 to a further component, in particular the battery 1, are of course also possible.

For the sake of completeness only, it should be noted that the cooling fluid can be a liquid, such as water in particular, or a gas.

The exemplary embodiments show possible embodiment variants of the invention, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are not obligatorily depicted to scale.

LIST OF REFERENCE NUMBERS

1 Battery
2 Device
3 Storage module
4 Film
5 Film
6 Coolant channel
7 Web
8 Plastic layer
9 Plastic layer
10 Layer
11 Plastic layer
12 Plastic layer
13 Layer
14 Enforcement layer
15 Enforcement layer
16 Structural element
17 Connection area
18 Breakthrough
19 Elastomer section
20 Lateral edge
21 Permanent magnet
22 Vehicle
23 Connecting element
24 Housing

The invention claimed is:

1. A device for cooling or temperature control for at least one storage module of a rechargeable battery, wherein the device comprises a first single-layer or multi-layer film and a further single-layer or multi-layer film, which are directly connected to each other in connection areas thus forming at least one coolant channel for a cooling fluid formed only by the partial connection of the first film and the further film, wherein at least one structural element is arranged between the first film and the further film, said structural element being configured to be stiffer as compared to the first film and the further film and being connected to the first film or to the further film the structural element being arranged entirely in the coolant channel, or directly adjacent to the coolant channel in one of the connecting areas, and wherein the structural element has an opening which extends from the first film towards the second film.

2. The device according to claim 1, wherein the structural element is arranged at a distance from a side edges of the device.

3. The device according to claim 1, wherein the structural element comprises at least partially of at least one plastic material.

4. The device according to claim 1, wherein the structural element comprises at least one elastomer section.

5. The device according to claim 1, wherein the opening extends through the at least one coolant channel in the flow direction.

6. The device according to claim 1, wherein the opening is configured so as to taper.

7. The device according to claim 1, wherein a permanent magnet is arranged in the at least one structural element.

8. The rechargeable battery having the at least one storage module for electrical energy and the device for cooling or temperature control for the at least one storage module, wherein the device is configured according to claim 1, wherein the device is connected to a housing of the battery via at least one connecting element, and wherein the connecting element extends through the at least one structural element.

9. A vehicle having the rechargeable battery, wherein the rechargeable battery is configured according to claim 8.

\* \* \* \* \*